(12) United States Patent
Roodt

(10) Patent No.: US 6,792,644 B2
(45) Date of Patent: Sep. 21, 2004

(54) WINDSCREEN WIPER WITH A WIPER ARM

(75) Inventor: Inigo Op't Roodt, Hasselt (BE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/469,504

(22) PCT Filed: Dec. 18, 2002

(86) PCT No.: PCT/DE02/04632
§ 371 (c)(1),
(2), (4) Date: Aug. 28, 2003

(87) PCT Pub. No.: WO03/051695
PCT Pub. Date: Jun. 26, 2003

(65) Prior Publication Data
US 2004/0074037 A1 Apr. 22, 2004

(51) Int. Cl.$^7$ ................................. B60S 1/40
(52) U.S. Cl. ............... 15/250.32; 15/250.351; 15/250.44
(58) Field of Search .......... 15/250.32, 250.44, 15/250.351, 250.361, 250.43, 250.31

(56) References Cited

U.S. PATENT DOCUMENTS

| 2,974,341 | A | * | 3/1961 | Hart | 15/250.32 |
|---|---|---|---|---|---|
| 4,132,490 | A | * | 1/1979 | Journee | 403/316 |
| 4,300,259 | A | * | 11/1981 | Maiocco | 15/250.32 |
| 4,649,591 | A | | 3/1987 | Guerard | |
| 5,435,041 | A | | 7/1995 | Ho | |
| 6,553,607 | B1 | * | 4/2003 | De Block | 15/250.32 |
| 6,611,988 | B1 | * | 9/2003 | De Block | 15/250.32 |

FOREIGN PATENT DOCUMENTS

| DE | 199 24 662 A | 11/2000 |
|---|---|---|
| EP | 0 053 960 A | 6/1982 |
| GB | 1 599 534 A | 10/1981 |

* cited by examiner

Primary Examiner—Gary K. Graham
(74) Attorney, Agent, or Firm—Michael Best & Friedrich LLP

(57) ABSTRACT

The invention starts with a windshield wiper with a wiper arm (10) on whose free end a pin (22) is fastened laterally, transverse to the longitudinal direction (72) and pointing to a wiper blade (24) for the articulated connection of the wiper blade (24), which pin is inserted into a passage opening of the wiper blade (24) and in an assembled position is locked axially via a bridge (12) that is arranged parallel to the pin (22) on the wiper arm (10) and grips over the wiper blade (24) with a bent end (14). It is proposed that the wiper blade (24) feature a supporting bracket system with a center bracket (26) that has an inset box (28), whose side walls (30) are connected to one another via an articulated bolt (32) and always feature at least one passage (34) offset in the longitudinal direction (72) to the articulated bolt (32), that a plastic adapter (38) that is essentially U-shaped in cross-section and open at the bottom be inserted from above into the inset box (28), from whose covering wall (40) collars (42) project laterally beyond the side walls (30) forming lateral guide surfaces (44) in the area of the bridge (12) to which a bearing surface (20) and the bent end (14) of the bridge (12) are adjacent in an assembled state, and that spring tongues (50) be formed in opposing side walls (46) via slots (48), at which tongues tubular bearing fittings (52) are formed, which lock into the passages (34) and in which the pin (22) is positioned.

7 Claims, 3 Drawing Sheets

WINDSCREEN WIPER WITH A WIPER ARM

BACKGROUND OF THE INVENTION

The invention starts with a windshield wiper with a wiper arm in accordance with the pre-characterizing clause of claim 1.

Known windshield wipers feature a wiper arm, which sits on a wiper shaft. This shaft is driven by a wiper motor. A wiper blade is connected in an articulated manner to the free end of the wiper arm. As a rule, the wiper blade has a multi-unit supporting bracket system with a central bracket. Linked to this are subordinate brackets, several of which at least, having claws on their ends, hold a wiper strip. Inarticulate wiper blades are also known, which, instead of the supporting bracket system, have a resilient elastic supporting element that is fabricated of plastic perpendicular to the windshield. In order to improve the spring property it can feature at least one spring rail made of spring steel. In an unloaded state, the supporting element has a greater curvature than the vehicle window so that the wiper strip is applied to the vehicle window with appropriate pressure distribution under the application force by the wiper arm.

Inarticulate wiper blades are low-slung, something that is very favorable with regard to its behavior in terms of flow technology and noise development in the air stream wind. A windshield wiper with an inarticulate wiper blade, which is linked to a wiper arm via a so-called "sidelock system," is known from DE 199 24 662 A1. For this purpose, a pin on the free end of the wiper arm, which features a U-shaped profile that is open towards the vehicle window, is riveted laterally, transverse to its longitudinal direction and pointing towards the wiper blade. The pin is pivoted in a rest bore hole of a connecting part, which is permanently connected to the supporting element of the wiper blade.

A bridge is arranged parallel to the pin on the wiper arm offset in the longitudinal direction and the bridge is bent at its free end towards the side of the pin. In an assembly position, in which the wiper blade is held transverse to the longitudinal direction of the wiper arm, the pin can be put into the rest bore hole of the connecting part. If the wiper blade is subsequently rotated parallel to the longitudinal direction of the wiper arm, the bridge grips over the wiper blade and locks it with its bent end so that in an assembled state the wiper blade is guided onto the pin between the bent end of the bridge and the wiper arm. In the wiper blade's operating position, the bridge dips into a corresponding groove of the connecting part and ends approximately flush with the upper side of the connecting part. For disassembly the wiper blade must be swiveled in the opposite direction until the bent end disengages and the wiper blade can be pulled from the pin.

Another sidelock system with a cylindrical adapter, which is used to compensate for different pin diameters, is known from U.S. Pat. No. 4,980,944 A1. The adapter has a rest bore hole, which is arranged eccentric to the outer contour of the adapter. In this arrangement, the eccentricity is selected in such a way that a continuous longitudinal slot is formed in the area of the circumference of the adapter. The adapter is pressed together for assembly and inserted into two openings of a U-shaped bracket of a wiper strip support. After being threaded in, the adapter reassumes its original form and with its circumference presses against the openings in the legs of the U-profile. A spring clip, which is arranged on the base surface of the U-profile and engages in the longitudinal slot, secures the adapter against twisting. Furthermore, it holds it in the axial direction by supporting itself on the lateral shoulders of the adapter. In a further assembly step, the pin fastened on the free end of the wiper arm can be put into the passage bore hole.

SUMMARY OF THE INVENTION

According to the invention, the wiper blade features a supporting bracket system with a center bracket that has an inset box, whose side walls are connected to one another via an articulated bolt and always feature at least one passage offset in the longitudinal direction to the articulated bolt. These types of wiper blades that are customary as such are used with wiper arms, which engage from above in the inset box with their hook-like end and encircle the articulated bolt with the use of an adapter or engage with two locking pins in two opposing passages.

According to the invention, a plastic adapter that is essentially U-shaped in cross-section and open at the bottom is inserted from above into the inset box, from whose covering wall collars project laterally beyond the side walls forming lateral guide surfaces in the area of the bridge. Adjacent to these are a bearing surface of the wiper arm and the bent end of the bridge in an assembled state and they guide the wiper blade in the axial direction of the pin. In addition, spring tongues are formed in opposing side walls of the adapter via slots on which tongues tubular bearing fittings are formed. These lock into passages and serve to pivot the wiper blade on the pin. The adapter supports itself with its collar on the side walls of the inset box so that it cannot rotate into the passages. In this process, the side walls each engage expediently in a groove which is provided in the collar. In addition, the adapter can be held by a clip, which is connected on the inside to the covering wall, preferably permanently, and in an assembled states encircles the articulated bolt with locking noses. This results in a very stable connection of the adapter to the wiper blade, thereby guaranteeing good guidance of the wiper blade.

Using the adapter in accordance with the invention, a wiper arm, whose free end is provided with a transverse pin for a sidelock system, can also be used for a wiper blade with a supporting bracket system. With respect to wind noise and flow resistance, the advantages that are connected with the flat, low construction of the sidelock system can be achieved with simple means also in the case of wiper blades with a supporting bracket system. In addition, the parts of the wiper arm and the wiper blade, which are normally fabricated of metal, namely sheet steel, can be isolated from one another by the adapter made of plastic so that movement noise and wear are minimized. In doing so, the shape and dimensions of the wiper arm and the wiper blade are advantageously retained so that no structural modifications or new tools are required to fabricate the components.

The adapter is inserted from above into the inset box, whereby the side walls of the adapter are adjacent to the insides of the inset box. Guide ribs are arranged on the outsides of the side walls in order to obtain defined contact surfaces in the area of the ends. These ribs are supported by a box-shaped hollow profile, which is formed by the front walls, parts of the side walls and the intermediate walls that run parallel to the front walls, and produces a rigid support. The parts of the side walls, which encircle the elastically flexible spring tongues with the bearing fittings, are separated from the hollow profiles by notches or recesses so that the bearing fittings can easily lock into the passages.

The adapter is expediently manufactured of a plastic, whereby all molded elements can be advantageously formed with the required precision during the injection process. In addition, as a rule plastic has good sliding properties, which are important in the case of the adapter according to the invention in the tubular bearing fittings since the pin of the wiper arm is pivoted here. Moreover, an intermediate adapter fabricated of plastic prevents undesired contact between the metal surfaces of the wiper arm and the wiper blade.

BRIEF DESCRIPTION OF THE DRAWINGS

Additional advantages are yielded from the following description of the drawings. An exemplary embodiment of the invention is depicted in the drawings. The drawings, the description and the claims contain numerous features in combination. The expert will also observe individual features expediently and combine them into additional, meaningful combinations.

The drawings show.

DESCRIPTION OF THE EXEMPLARY EMBODIMENT

Figure 1:
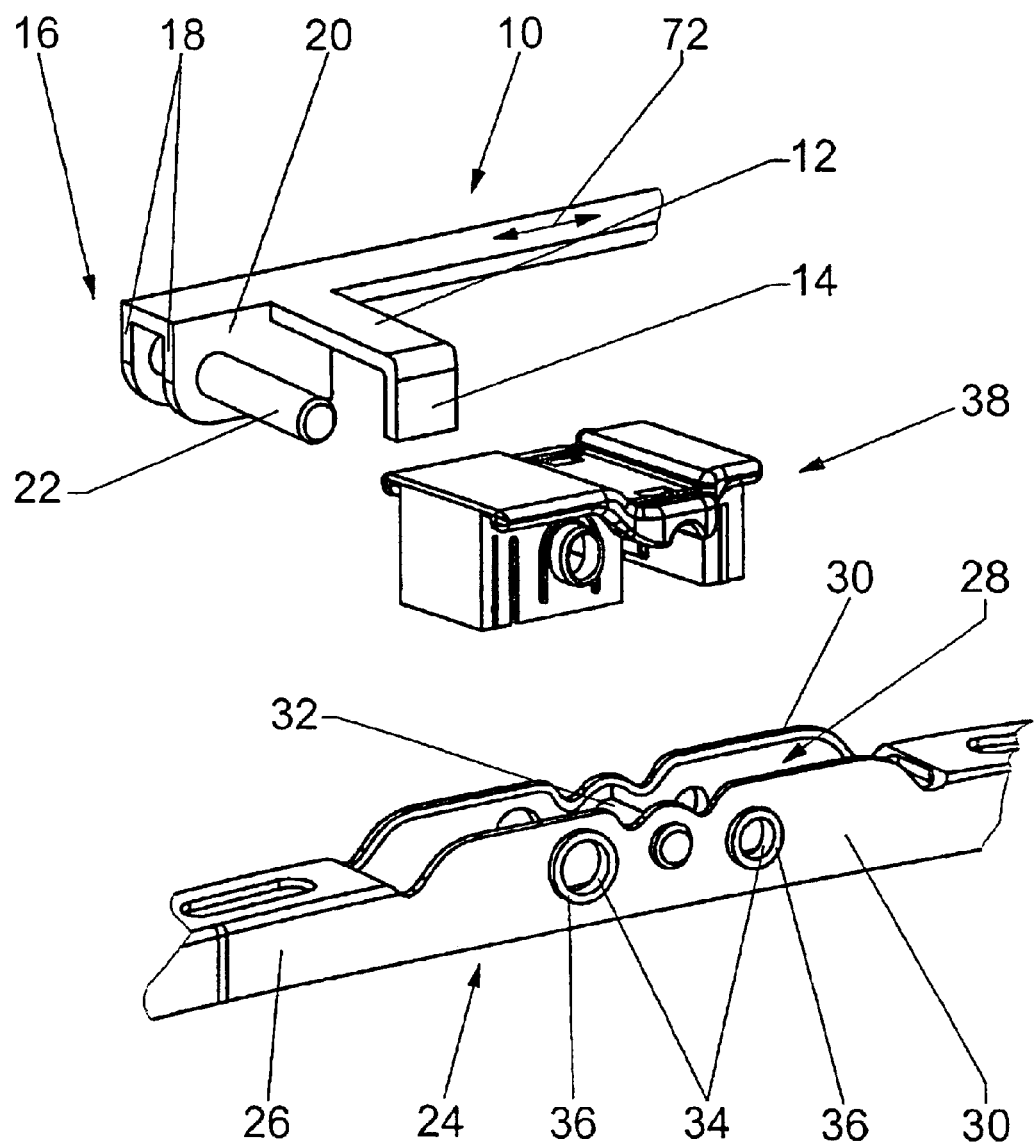
FIG. 1 An exploded depiction of an articulated connection between a wiper arm and a wiper blade, FIG. 2 a perspective view of an adapter from above and FIG. 3 a perspective view of an adapter from below.
Figure 2:
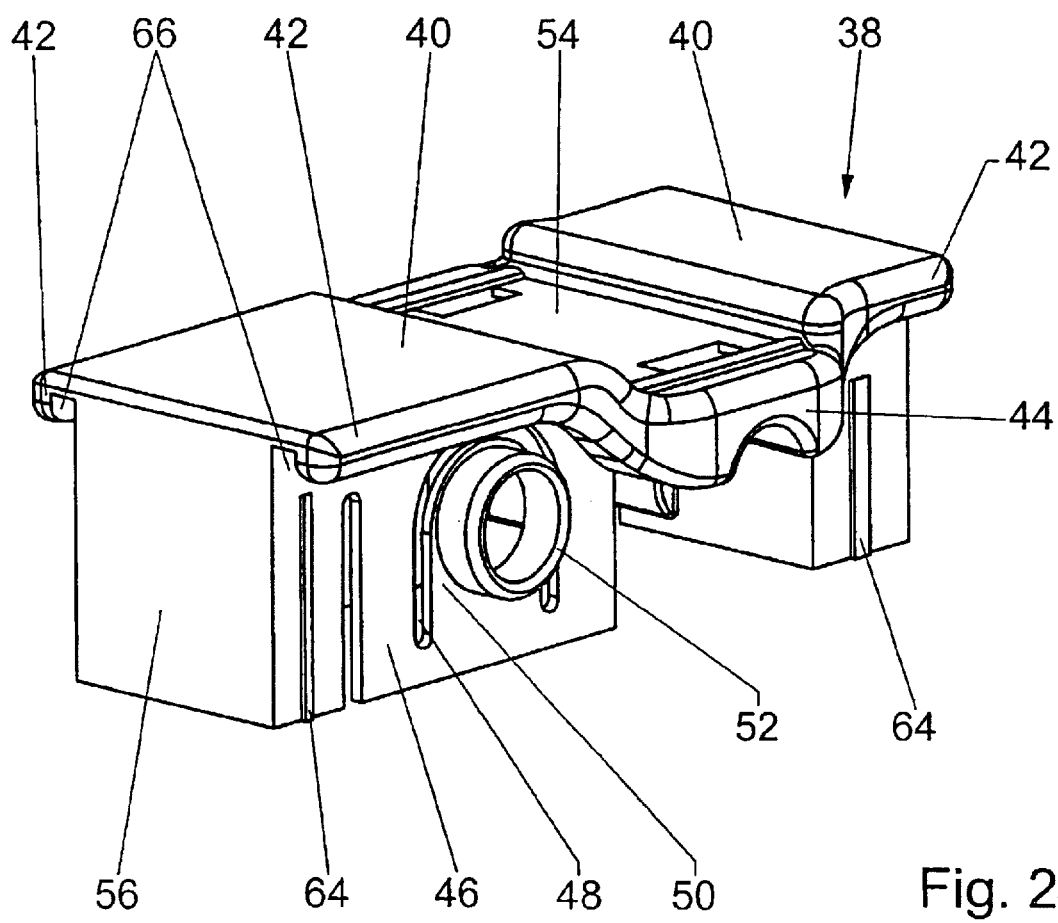

Of a windshield wiper, just the parts of a wiper arm 10 and a wiper blade 24 (FIG. 1) that are required to understand the invention are depicted. The wiper arm 10 has a U-shaped profile 16, on whose legs 18 a pin 22 is fastened laterally, transverse to the longitudinal direction 72 and pointing to the wiper blade 24, so that the wiper blade 24 can be assembled according to the sidelock system and a low construction height of the windshield wiper can be achieved. In addition, a bridge 12 is formed on the free end of the wiper arm 10, which bridge is arranged parallel to the pin 22 and offset in the longitudinal direction 72 relative to this pin and features a bent end 14. The wiper blade 24 has a supporting bracket system, of which a center bracket 26 is depicted, which has an inset box 28, whose side walls 30 are connected to one another via an articulated bolt 32. In addition, two opposing passages 34 are each arranged on both sides of the articulated bolt 32 offset in the longitudinal direction 72 in the side walls 30.

Figure 3:
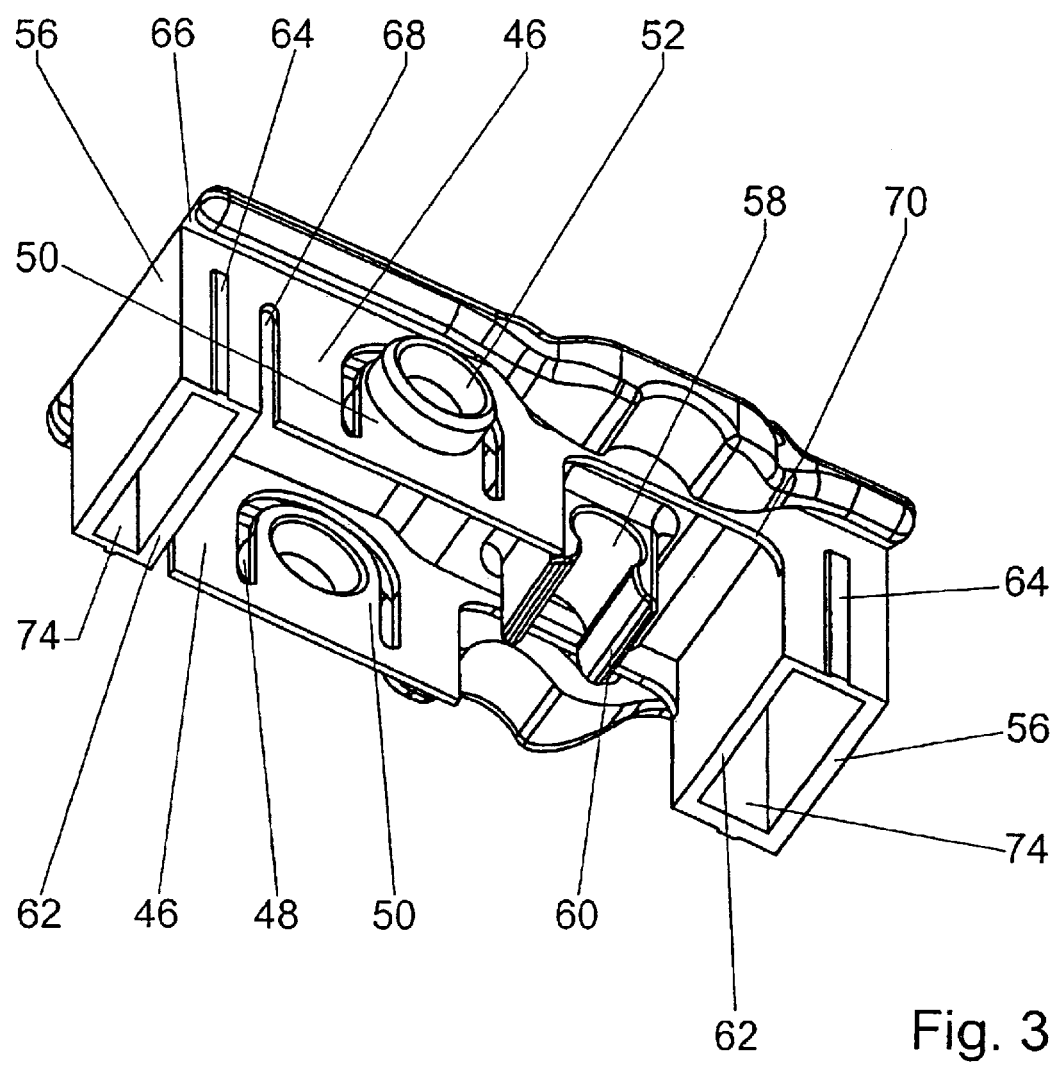

The wiper blade 24 is connected to the wiper arm 10 with the aid of an adapter 38. The adapter 38 essentially has a U-shaped cross-section with a covering wall 40 and side walls 46. While it is open at the bottom, the ends are closed by front walls 56. These are dimensioned in such a way that in an assembled state the side walls 46 of the adapter 38 are supported on the side walls 30 of the inset box 28. In order to achieve stable support, intermediate walls 62 are provided at a distance from the front walls 56 (FIG. 3), which along with the front walls 56 and parts of the side walls 46 form a dimensionally stable hollow profile 74. In order to be able to fit the adapter 38 more easily into the inset box 28, guide ribs 64 that run parallel to the front walls 56 are provided on the outsides of the side walls 46 in the area of the hollow profile 74.

Slots 68 or recesses 70, which are open at the bottom, separate the area of the hollow profile 74 from the remaining area of the side walls 46. Spring tongues 50 are provided in this area, which are formed by slots 48 in the shape of an arc in the side walls 46. The spring tongues 50 bear outward pointing bearing fittings 52 for the pin 22, which can yield elastically towards the inside when the adapter 38 is being assembled and then can lock into the passages 34 of the inset box 28. In order to increase the contact surfaces between the passages 34 and the bearing fittings, the passages 34 have edges 36 pointing outward. The surface pressure on the bearing fittings 52 is hereby reduced.

The covering wall 40 projects laterally beyond the side walls 46 far enough that in an assembled state it covers the upper edges of the side walls 30 of the inset box 28 with collars 42, whereby the side walls 30 dip into grooves 66 of the collar 42. The adapter 38 can support itself on the inset box 28 with the collars 42 so that it is secured against twisting around the swivel axis of the wiper blades 24.

The covering wall 40 has a depression 54 on its outside, the depth of which is coordinated with the material strength of the bridge 12. As a result, in an assembled state the bridge 12 can engage in the depression 54 and end with its outer surface approximately flush with the outer surface of the covering wall 40. This produces flow technological and optical advantages. The collars 42 are adapted in the progression of the depression 54 and have guide surfaces 44 on their outer sides in this area, which in an assembled state are adjacent on the one side of the adapter 38 to a bearing surface 20 of the wiper arm 10 and on the other side to the bent end 14 of the bridge 12. The adapter 38 has a clip 58 pointing inward from the covering wall 40, which clip in an assembled state encircles the articulated bolt 32 of the wiper arm 24 with locking noses 60.

For assembly, the adapter 38 is inserted from above into the inset box 28, whereby the bearing fittings 52 lock into the passages 34 and the clip 58 locks onto the articulated bolt 32. This produces a stable connection between the adapter 38 and the wiper blade 24, thereby guaranteeing good guidance of the wiper 24.

The wiper blade 24 is now rotated with the assembled adapter 38 around its rotational axis so far that the wiper blade 24 is positioned approximately perpendicular to the longitudinal direction 72 of the wiper arm 10. In this position, the wiper blade 24 can be slid onto the pin 22 of the wiper arm 10. Then it is rotated back into the initial position where the wiper blade 24 runs approximately parallel to the longitudinal direction 72 of the wiper arm 10. In this position, the bridge 12 grips over the wiper blade 24 and dips into the depression 54 of the adapter 38, whereby the outer surfaces of the bridge 12 and of the adapter 38 end approximately flush. At the same time, the bent end 14 of the bridge 12 ends up adjacent to the allocated guide surface 44 of the adapter 38, thereby locking the articulated connection in the axial direction.

What is claimed is:

1. Windshield wiper with a wiper arm (10) on whose free end a pin (22) is fastened laterally, transverse to the longitudinal direction (72) and pointing to a wiper blade (24) for the articulated connection of the wiper blade (24), which pin is inserted into a passage opening of the wiper blade (24) and in an assembled position is locked axially via a bridge (12) that is arranged parallel to the pin (22) on the wiper arm (10) and grips over the wiper blade (24) with a bent end (14), characterized in that the wiper blade (24) features a supporting bracket system with a center bracket (26) that has an inset box (28), whose side walls (30) are connected to one another via an articulated bolt (32) and always feature at least one passage (34) offset in the longitudinal direction (72) to the articulated bolt (32), in that a plastic adapter (38) that is essentially U-shaped in cross-section and open at the bottom is inserted from above into the inset box (28), from whose covering wall (40) collars (42) project laterally beyond the side walls (30) forming lateral guide surfaces

(44) in the area of the bridge (12) to which a bearing surface (20) and the bent end (14) of the bridge (12) are adjacent in an assembled state, and in that spring tongues (50) are formed in opposing side walls (46) via slots (48), at which tongues tubular bearing fittings (52) are formed, which lock into the passages (34) and in which the pin (22) is positioned.

2. Windshield wiper according to claim 1, characterized in that the covering wall (40) of the adapter (38) features a depression (54) that runs crosswise in the area of the bridge (12) whose depth is adapted to the material strength of the bridge (12).

3. Windshield wiper according to one of the preceding claims, characterized in that a clip (58) is provided on the inside of the covering wall (40), which in an assembled state encircles the articulated bolt (32) with locking noses (60).

4. Windshield wiper according to claim 3, characterized in that the clip (58) is permanently connected with the covering wall (40).

5. Windshield wiper according to one of the preceding claims, characterized in that intermediate walls (62) are arranged parallel to the front walls (56) of the adapter (38), which intermediate walls form a box-shaped hollow profile (74) together with the side wall (46), whereby guide ribs (64) are arranged on the outside of the side walls (46) in the area of the hollow profile (74).

6. Windshield wiper according to claim 5, characterized in that the side walls (46) between the intermediate walls (62) and the flexible tongues (50) feature slots (68) or recesses (70) that are open at the bottom.

7. Windshield wiper according to one of the preceding claims, characterized in that a groove (66) is provided in the collar (42) of the covering wall (40) into which the side walls (30) of the inset box (28) engage in an assembled state.

* * * * *